US008155924B2

(12) United States Patent
Tracey

(10) Patent No.: US 8,155,924 B2
(45) Date of Patent: Apr. 10, 2012

(54) METHOD AND APPARATUS FOR THREE DIMENSIONAL CALIBRATION OF AN ON-BOARD DIAGNOSTICS SYSTEM

(75) Inventor: Timothy D. Tracey, Lakewood, CA (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 13/166,553

(22) Filed: Jun. 22, 2011

(65) Prior Publication Data

US 2011/0251816 A1 Oct. 13, 2011

Related U.S. Application Data

(63) Continuation of application No. 12/243,720, filed on Oct. 1, 2008, now Pat. No. 7,991,585.

(51) Int. Cl.
*G06F 11/30* (2006.01)
*G06F 7/00* (2006.01)
*F02P 5/15* (2006.01)

(52) U.S. Cl. .................... 702/183; 701/106; 123/406.29

(58) Field of Classification Search .................. 702/183; 701/102; 73/117.3; 123/406.29
See application file for complete search history.

(56) References Cited

U.S. PATENT DOCUMENTS

| | | | |
|---|---|---|---|
| 5,119,783 | A | 6/1992 | Komurasaki |
| 5,268,842 | A | 12/1993 | Marston et al. |
| 5,487,008 | A | 1/1996 | Ribbens et al. |
| 5,528,931 | A | 6/1996 | James et al. |
| 5,576,963 | A | 11/1996 | Ribbens et al. |
| 5,689,065 | A | 11/1997 | Kuroda et al. |
| 5,732,382 | A | 3/1998 | Puskorius et al. |
| 5,774,823 | A | 6/1998 | James et al. |
| 5,794,171 | A | 8/1998 | Bryant et al. |
| 5,862,507 | A | 1/1999 | Wu et al. |
| 6,212,945 | B1 | 4/2001 | Moskwa |
| 6,240,772 | B1 * | 6/2001 | Thomas .................... 73/114.01 |
| 6,292,738 | B1 | 9/2001 | Feldkamp et al. |
| 6,495,415 | B2 | 12/2002 | Hartner et al. |
| 6,978,666 | B1 | 12/2005 | Wu et al. |
| 7,032,439 | B2 | 4/2006 | Lee et al. |

* cited by examiner

*Primary Examiner* — Bryan Bui
(74) *Attorney, Agent, or Firm* — Snell & Wilmer LLP

(57) ABSTRACT

The present invention relates to a method and apparatus for three dimensional calibration of an on-board diagnostics system. In one embodiment, the present invention is a method for calibrating an on-board diagnostic system for an automobile including the steps of generating a three dimensional surface corresponding to an engine operating under a first condition, generating a three dimensional surface corresponding to the engine operating under a second condition, and generating a three dimensional threshold surface using the three dimensional surface corresponding to the engine operating under the first condition and the three dimensional surface corresponding to the engine operating under the second condition.

18 Claims, 4 Drawing Sheets

36

| | 12 | 16 | 20 | 24 | 28 | 32 | 36 | 40 |
|---|---|---|---|---|---|---|---|---|
| 500 | -0.1902 | -0.2064 | -0.2233 | -0.2465 | -0.2826 | -0.3127 | -0.3334 | -0.3484 |
| 600 | -0.1498 | -0.1834 | -0.1989 | -0.2259 | -0.2642 | -0.2925 | -0.3106 | -0.3251 |
| 700 | -0.12 | -0.16 | -0.1871 | -0.2057 | -0.2448 | -0.2721 | -0.2878 | -0.3025 |
| 800 | -0.11 | -0.1414 | -0.1759 | -0.1881 | -0.2247 | -0.2509 | -0.2651 | -0.2812 |
| 900 | -0.095 | -0.126 | -0.1587 | -0.1751 | -0.2055 | -0.2285 | -0.2437 | -0.2619 |
| 1000 | -0.085 | -0.1221 | -0.1492 | -0.1664 | -0.1872 | -0.2076 | -0.2255 | -0.2446 |
| 1100 | -0.075 | -0.0983 | -0.1396 | -0.1562 | -0.17 | -0.1898 | -0.2087 | -0.2292 |
| 1200 | -0.07 | -0.0944 | -0.1258 | -0.1378 | -0.1546 | -0.1756 | -0.196 | -0.2155 |
| 1300 | -0.07 | -0.0691 | -0.1152 | -0.1274 | -0.1428 | -0.1646 | -0.1841 | -0.203 |
| 1400 | -0.0764 | -0.0875 | -0.1089 | -0.1184 | -0.1375 | -0.1562 | -0.174 | -0.1915 |
| 1500 | -0.0854 | -0.0905 | -0.1046 | -0.1249 | -0.1359 | -0.1497 | -0.1653 | -0.1808 |
| 1600 | -0.0919 | -0.0926 | -0.1012 | -0.1169 | -0.134 | -0.145 | -0.1577 | -0.1707 |
| 1700 | -0.0949 | -0.0934 | -0.0971 | -0.1108 | -0.1299 | -0.1412 | -0.1511 | -0.1612 |
| 1800 | -0.095 | -0.0825 | -0.0928 | -0.1075 | -0.1262 | -0.1374 | -0.1449 | -0.1522 |

ENGINE LOAD %

38

ENGINE SPEED (RPM)

METHOD AND APPARATUS FOR THREE DIMENSIONAL CALIBRATION OF AN ON-BOARD DIAGNOSTICS SYSTEM

CROSS REFERENCE TO RELATED APPLICATIONS

This application is a continuation application of U.S. patent application Ser. No. 12/243,720, filed on Oct. 1, 2008, now U.S. Pat. No. 7,991,585, issued on Aug. 2, 2011, the entire contents of which is incorporated herein by reference.

BACKGROUND

1. Field

The present invention relates to a method and apparatus for three dimensional calibration of an on-board diagnostics system.

2. Background

An engine sometimes malfunctions when in operation with such malfunctions becoming hazardous if the malfunctions are undetected. To detect the malfunctions, on-board diagnostic systems can utilize a map to determine the threshold values at which the engine is malfunctioning. However, the threshold values in the map require a large amount of time and effort to create and are not always accurate.

Thus, there is a need for a method and apparatus to produce a more accurate map in a reduced amount of time to determine the threshold values at which the engine is malfunctioning.

SUMMARY

In one embodiment, the present invention is a method for calibrating an on-board diagnostic system for an automobile including the steps of generating a three dimensional surface corresponding to an engine operating under a first condition, generating a three dimensional surface corresponding to the engine operating under a second condition, and generating a three dimensional threshold surface using the three dimensional surface corresponding to the engine operating under the first condition and the three dimensional surface corresponding to the engine operating under the second condition.

In another embodiment, the present invention is a method for calibrating an on-board diagnostic system for an automobile including the steps of generating crankshaft acceleration data of an engine operating under a normal condition, where each of the crankshaft acceleration data of the engine operating under the normal condition corresponding to an engine load value of the engine operating under the normal condition and an engine speed value of the engine operating under the normal condition.

The present invention further includes the steps of interpolating the crankshaft acceleration data of the engine operating under the normal condition by interpolating a first crankshaft acceleration data of the engine operating under the normal condition with a second crankshaft acceleration data of the engine operating under the normal condition, the first crankshaft acceleration data of the engine operating under the normal condition and the second crankshaft acceleration data of the engine operating under the normal condition corresponding to different engine load values of the engine operating under the normal condition and to different engine speed values of the engine operating under the normal condition, interpolating the first crankshaft acceleration data of the engine operating under the normal condition with a third crankshaft acceleration data of the engine operating under the normal condition, the first crankshaft acceleration data of the engine operating under the normal condition and the third crankshaft acceleration data of the engine operating under the normal condition corresponding to the same engine load value of the engine operating under the normal condition and to different engine speed values of the engine operating under the normal condition, and interpolating the first crankshaft acceleration data of the engine operating under the normal condition with a fourth crankshaft acceleration data of the engine operating under the normal condition, the first crankshaft acceleration data of the engine operating under the normal condition and the fourth crankshaft acceleration data of the engine operating under the normal condition corresponding to different engine load values of the engine operating under the normal condition and to the same engine speed value of the engine operating under the normal condition.

The present invention can also include the steps of generating a three dimensional surface corresponding to the engine operating under the normal condition using the interpolation of the crankshaft acceleration data of the engine operating under the normal condition, and generating crankshaft acceleration data of the engine operating under a malfunctioning condition, where each of the crankshaft acceleration data of the engine operating under the malfunctioning condition corresponding to an engine load value of the engine operating under the malfunctioning condition, and an engine speed value of the engine operating under the malfunctioning condition.

In addition, the present invention can include the steps of interpolating the crankshaft acceleration data of the engine operating under the malfunctioning condition by interpolating a first crankshaft acceleration data of the engine operating under the malfunctioning condition with a second crankshaft acceleration data of the engine operating under the malfunctioning condition, the first crankshaft acceleration data of the engine operating under the malfunctioning condition and the second crankshaft acceleration data of the engine operating under the malfunctioning condition corresponding to different engine load values of the engine operating under the malfunctioning condition and to different engine speed values of the engine operating under the malfunctioning condition, interpolating the first crankshaft acceleration data of the engine operating under the malfunctioning condition with a third crankshaft acceleration data of the engine operating under the malfunctioning condition, the first crankshaft acceleration data of the engine operating under the malfunctioning condition and the third crankshaft acceleration data of the engine operating under the malfunctioning condition corresponding to the same engine load value of the engine operating under the malfunctioning condition and to different engine speed values of the engine operating under the malfunctioning condition, and interpolating the first crankshaft acceleration data of the engine operating under the malfunctioning condition with a fourth crankshaft acceleration data of the engine operating under the malfunctioning condition, the first crankshaft acceleration data of the engine operating under the malfunctioning condition and the fourth crankshaft acceleration data of the engine operating under the malfunctioning condition corresponding to different engine load values of the engine operating under the malfunctioning condition and to the same engine speed value of the engine operating under the malfunctioning condition.

The present invention can also include the steps of generating a three dimensional surface corresponding to the engine operating under the malfunctioning condition using the interpolation of the crankshaft acceleration data of the engine operating under the malfunctioning condition, and generating a three dimensional threshold surface using the three dimensional surface corresponding to the engine operating under the normal condition and the three dimensional surface corresponding to the engine operating under the malfunctioning condition.

In yet another embodiment, the present invention is a system for calibrating an on-board diagnostic system for an automobile including an engine and an engine control unit comprising including a calibration unit configured to be connected to the engine and the engine control unit. The calibration unit can detect a crankshaft acceleration of the engine operating under a normal condition, and generate crankshaft acceleration data of the engine operating under a normal condition, where each of the crankshaft acceleration data of the engine operating under the normal condition corresponding to an engine load value of the engine operating under the normal condition and an engine speed value of the engine operating under the normal condition.

The calibration unit can also interpolate the crankshaft acceleration data of the engine operating under the normal condition by interpolating a first crankshaft acceleration data of the engine operating under the normal condition with a second crankshaft acceleration data of the engine operating under the normal condition, the first crankshaft acceleration data of the engine operating under the normal condition and the second crankshaft acceleration data of the engine operating under the normal condition corresponding to different engine load values of the engine operating under the normal condition and to different engine speed values of the engine operating under the normal condition, interpolating the first crankshaft acceleration data of the engine operating under the normal condition with a third crankshaft acceleration data of the engine operating under the normal condition, the first crankshaft acceleration data of the engine operating under the normal condition and the third crankshaft acceleration data of the engine operating under the normal condition corresponding to the same engine load value of the engine operating under the normal condition and to different engine speed values of the engine operating under the normal condition, and interpolating the first crankshaft acceleration data of the engine operating under the normal condition with a fourth crankshaft acceleration data of the engine operating under the normal condition, the first crankshaft acceleration data of the engine operating under the normal condition and the fourth crankshaft acceleration data of the engine operating under the normal condition corresponding to different engine load values of the engine operating under the normal condition and to the same engine speed value of the engine operating under the normal condition.

The calibration unit can also generate a three dimensional surface corresponding to the engine operating under the normal condition using the interpolation of the crankshaft acceleration data of the engine operating under the normal condition, detect a crankshaft acceleration of the engine operating under a malfunctioning condition, and generate crankshaft acceleration data of the engine operating under the malfunctioning condition, where each of the crankshaft acceleration data of the engine operating under the malfunctioning condition corresponding to an engine load value of the engine operating under the malfunctioning condition, and an engine speed value of the engine operating under the malfunctioning condition.

Furthermore, the calibration unit interpolates the crankshaft acceleration data of the engine operating under the malfunctioning condition by interpolating a first crankshaft acceleration data of the engine operating under the malfunctioning condition with a second crankshaft acceleration data of the engine operating under the malfunctioning condition, the first crankshaft acceleration data of the engine operating under the malfunctioning condition and the second crankshaft acceleration data of the engine operating under the malfunctioning condition corresponding to different engine load values of the engine operating under the malfunctioning condition and to different engine speed values of the engine operating under the malfunctioning condition, interpolating the first crankshaft acceleration data of the engine operating under the malfunctioning condition with a third crankshaft acceleration data of the engine operating under the malfunctioning condition, the first crankshaft acceleration data of the engine operating under the malfunctioning condition and the third crankshaft acceleration data of the engine operating under the malfunctioning condition corresponding to the same engine load value of the engine operating under the malfunctioning condition and to different engine speed values of the engine operating under the malfunctioning condition, and interpolating the first crankshaft acceleration data of the engine operating under the malfunctioning condition with a fourth crankshaft acceleration data of the engine operating under the malfunctioning condition, the first crankshaft acceleration data of the engine operating under the malfunctioning condition and the fourth crankshaft acceleration data of the engine operating under the malfunctioning condition corresponding to different engine load values of the engine operating under the malfunctioning condition and to the same engine speed value of the engine operating under the malfunctioning condition.

The calibration unit can also generate a three dimensional surface corresponding to the engine operating under the malfunctioning condition using the interpolation of the crankshaft acceleration data of the engine operating under the malfunctioning condition, and generate a three dimensional threshold surface using the three dimensional surface corresponding to the engine operating under the normal condition and the three dimensional surface corresponding to the engine operating under the malfunctioning condition.

BRIEF DESCRIPTION OF THE DRAWINGS

The features, objects, and advantages of the present invention will become more apparent from the detailed description set forth below when taken in conjunction with the drawings, wherein.

DETAILED DESCRIPTION

Apparatus, systems and methods that implement the embodiments of the various features of the present invention will now be described with reference to the drawings. The drawings and the associated descriptions are provided to illustrate some embodiments of the present invention and not to limit the scope of the present invention. Throughout the drawings, reference numbers are re-used to indicate correspondence between referenced elements.

Figure 1:
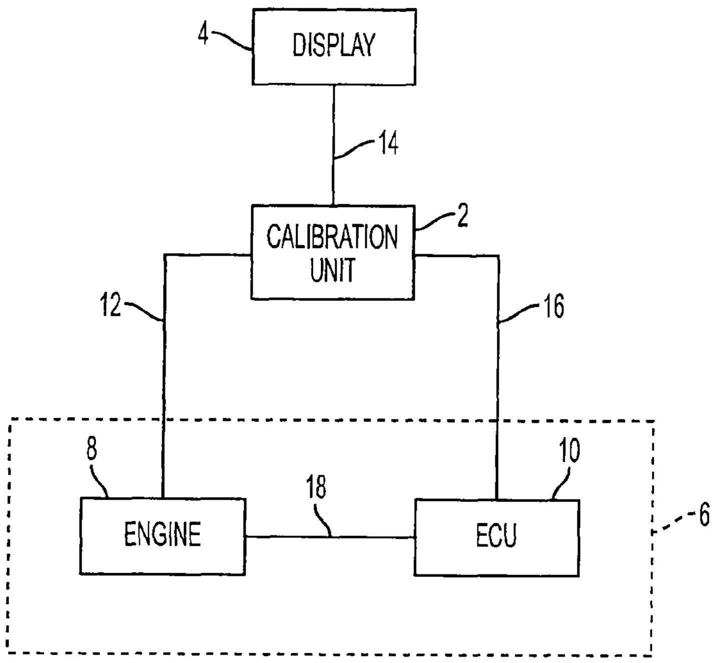
FIG. 1 is a schematic block diagram according to an embodiment of the present invention.

FIG. 1 is a schematic diagram of an embodiment of the present invention. In one embodiment, the present invention is a calibration unit 2 that is connected to an engine 8 and an on-board diagnostics unit such as an engine control unit ("ECU") 10 through connections 12 and 16, respectively. Calibration unit 2 can also be connected to a display 4 through connection 14. Engine 8 and ECU 10 are connected to each other through connection 18 and can be components of a transportation unit such as an automobile 6.

In operation, when engine 8 is activated and is in operation, ECU 10 monitors the operations of engine 8. ECU 10 receives data from the operations of automobile 6 and compares the received data from the operations of automobile 6 with an ECU map containing threshold data values for the engine. The threshold data value for the engine can be, for example, threshold crankshaft acceleration data for the engine corresponding to a speed of the engine, such as rotations per minute, and a load of the engine. If the received data falls below the threshold data value, ECU 10 can detect a malfunction in the engine.

To ensure that the ECU map contains the appropriate threshold values for the engine, the calibration unit 2 can receive data from engine 8 to generate the appropriate ECU map. Once calibration unit 2 generates the appropriate ECU map, calibration unit 2 can load the appropriate ECU map into ECU 10, thus calibrating ECU 10. While calibration unit 2 is generating the ECU map, calibration unit 2 can display graphs and/or charts in display 4 related to the ECU map.

Figure 7:
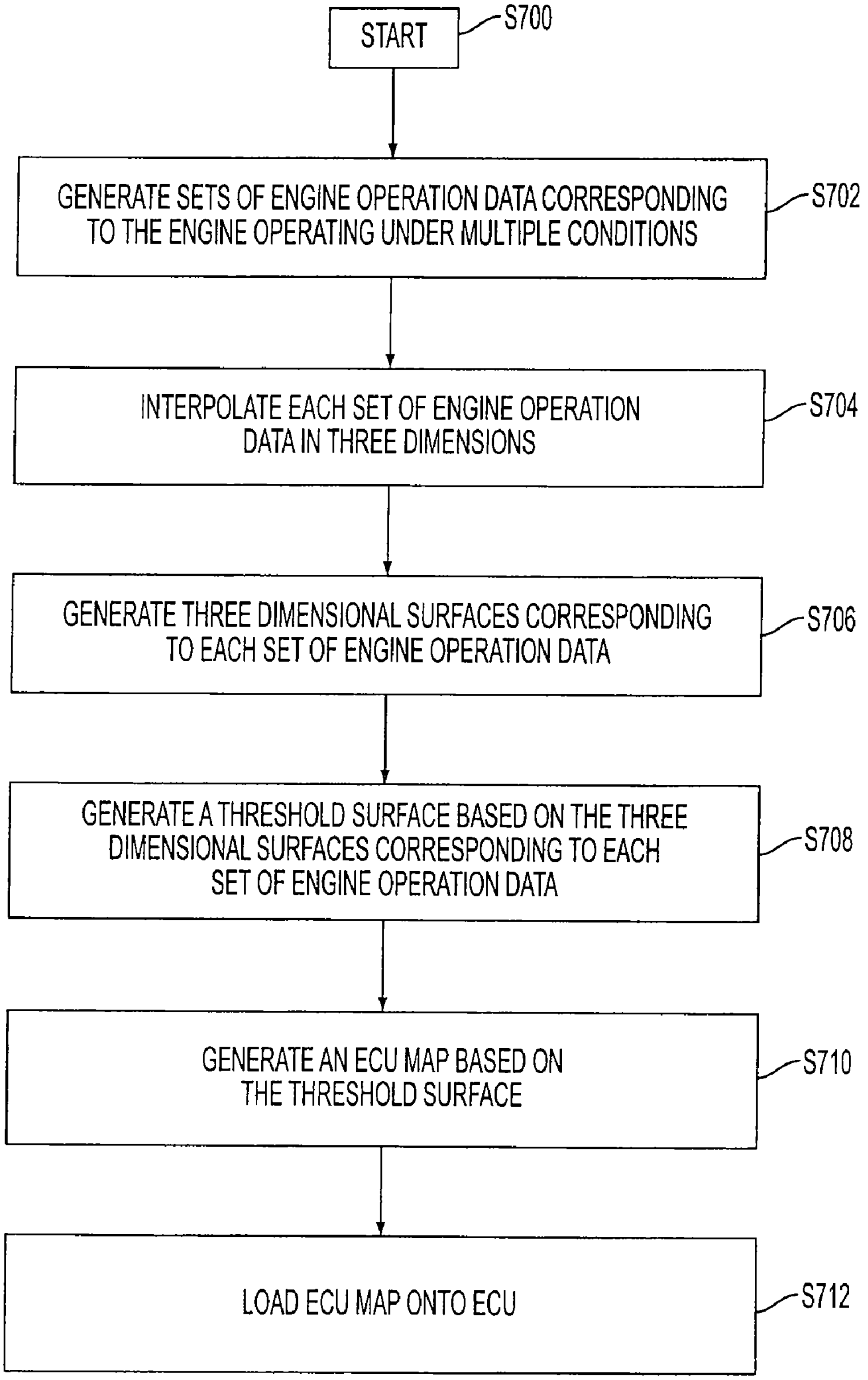
FIG. 7 is a flow chart showing the steps of generating an ECU map based on a threshold surface according to an embodiment of the present invention.

In one embodiment of the present invention, calibration unit 2 generates the ECU map according to the steps shown in FIG. 7. FIG. 7 is a flow chart of an embodiment of the present invention. In step S700, the calibration begins. In step S702, calibration unit 2 generates sets of engine operation data corresponding to the engine operating under multiple conditions. For example, calibration unit 2 can generate a first set of crankshaft acceleration data of the engine operating under normal conditions and a second set of crankshaft acceleration data of the engine operating under the malfunctioning condition. That is, the first set of crankshaft acceleration data can be generated when the engine is operating under normal conditions. The second set of crankshaft acceleration data can be generated when a malfunction in the engine is introduced and the engine is operating under the malfunctioning condition. The malfunctioning condition can be, for example, one or more pistons misfiring in the engine.

Figure 2:
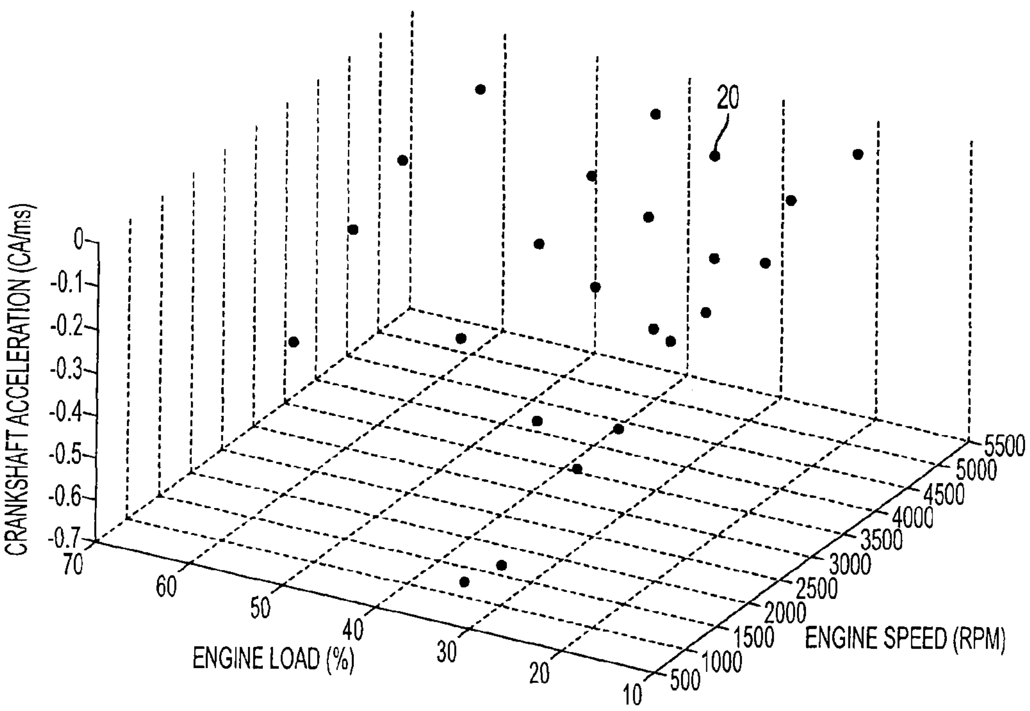
FIG. 2 is an exemplary three dimensional graph of a set of crankshaft acceleration data according to an embodiment of the present invention.

Each of the crankshaft acceleration data can be correlated with test values such as an engine load and an engine speed. The crankshaft acceleration data can be expressed as an amount of change in crankshaft acceleration per millisecond ("CA/ms") while the engine load can be expressed as a percentage and the engine speed can be expressed in rotations per minute ("RPM"). Each set of crankshaft acceleration data can be plotted on a separate graph as shown in FIG. 2. FIG. 2 is an exemplary three dimensional graph of a set of crankshaft acceleration data according to an embodiment of the present invention. As shown in FIG. 2, each crankshaft acceleration data point 20 has a corresponding engine speed value and an engine load value. One or more graphs, as exemplified in FIG. 2, can be shown on display 4 of FIG. 1.

To collect and generate the crankshaft acceleration data for the engine operating under normal conditions, a first engine speed can be used and held constant while the engine load is varied. Then a second engine speed can be used and held constant and the engine load can be varied again. This can be repeated until an appropriate amount of crankshaft acceleration data is collected and generated for the engine operating under normal conditions. The data collection and generation process can be repeated with the engine operating under the malfunctioning condition.

Oftentimes it may be difficult to maintain the engine speed and/or engine load constant such as when a malfunction condition is introduced into the engine. That is, the desired engine speed may be 2000 RPM, but with the introduction of the malfunction condition, the engine RPM may be 1995 RPM. The present invention can advantageously correlate the crankshaft acceleration data with 1995 RPM instead of 2000 RPM and also the corresponding engine load value. Thus it may be unnecessary to adjust the engine settings such as the engine load value in an attempt to have the engine operate at 2000 RPM. Advantageously this can reduce the amount of time necessary to collect the crankshaft acceleration data.

Figure 3:
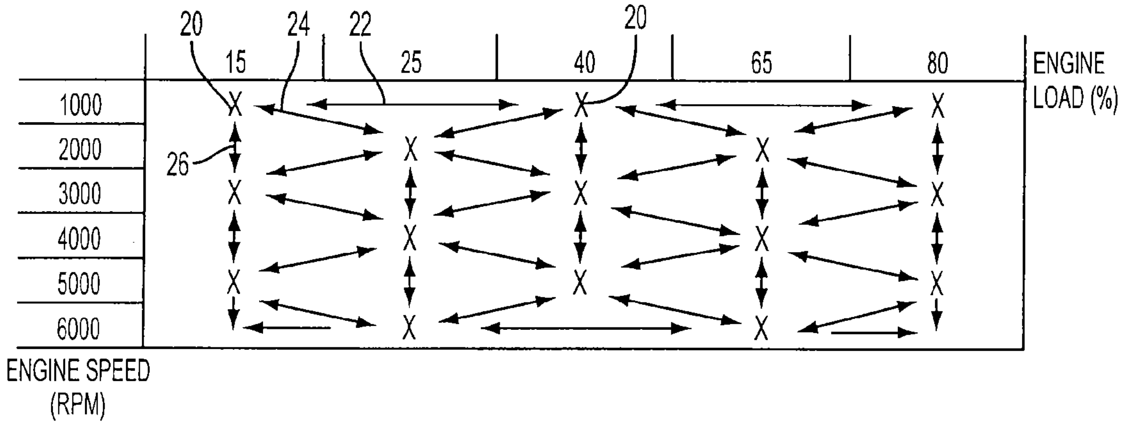
FIG. 3 is a chart exemplifying interpolation of a set of crankshaft acceleration data according to an embodiment of the present invention.

In step S704, each set of crankshaft acceleration data is interpolated in three dimensions as shown in FIG. 3. FIG. 3 is a chart exemplifying interpolation of a set of crankshaft acceleration data according to an embodiment of the present invention. Thus, for the first set of crankshaft acceleration data for the engine operating under normal conditions, crankshaft acceleration data point 20 can be interpolated with other crankshaft acceleration data point 20 correlated with the same engine speed value and different engine load values as indicated by line 22. The crankshaft acceleration data point 20 can also be interpolated with other crankshaft acceleration data point 20 correlated with different engine speed values and the same engine load value as indicated by line 26. Furthermore, the crankshaft acceleration data point 20 can also be interpolated with other crankshaft acceleration data point 20 correlated with different engine speed values and different engine load values as indicated by line 24. The interpolation process can also be performed for the second set of crankshaft acceleration data for the engine operating under a malfunctioning condition. The chart as exemplified in FIG. 3 can be shown on display 4 of FIG. 1.

Since the interpolation step S704 is done three dimensionally, the interpolation is more accurate than if the interpolation was done in only two dimensions. That is, by interpolating the crankshaft acceleration data with the engine speed and/or engine load varying, the interpolation is more accurate than interpolating the crankshaft acceleration data with only the engine speed varying or only the engine load varying. Thus, interpolating the crankshaft acceleration data in three dimensions can utilize 50% less crankshaft acceleration data points 20 to provide the same accuracy as interpolating the crankshaft acceleration data with only the engine speed varying or only the engine load varying.

Figure 4:
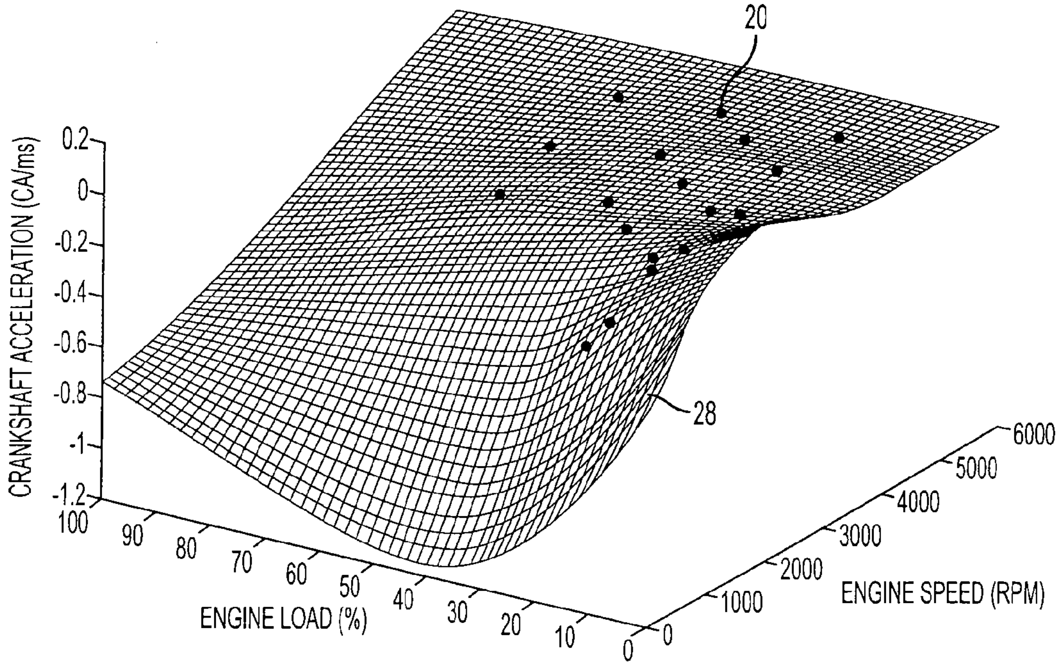
FIG. 4 is a graph of a three dimensional surface corresponding to a set of crankshaft acceleration data according to an embodiment of the present invention.

In step S706, three dimensional surfaces are generated for each set of crankshaft acceleration data as shown in FIG. 4. FIG. 4 is a graph of a three dimensional surface corresponding to a set of crankshaft acceleration data according to an embodiment of the present invention. That is, a three dimensional surface 28 as exemplified in FIG. 4 is generated for the first set of crankshaft acceleration data for the engine operating under normal conditions using the interpolation of the first set of crankshaft acceleration data for the engine operating under normal conditions. Another three dimensional surface can also be generated for the second set of crankshaft acceleration data for the engine operating under the malfunctioning condition using the interpolation of the second set of crankshaft acceleration data for the engine operating under the malfunctioning condition.

If there are multiple sets of crankshaft acceleration data for the engine operating under normal conditions, three dimensional surface 28 can be generated for each set of crankshaft acceleration data for the engine operating under normal conditions. Likewise, if there are multiple sets of crankshaft acceleration data for the engine operating under the malfunctioning condition, three dimensional surface 28 can be generated for each set of crankshaft acceleration data for the engine operating under the malfunctioning condition. The graph as exemplified in FIG. 4 can be shown in display 4 of FIG. 1.

Figures 5, 6:
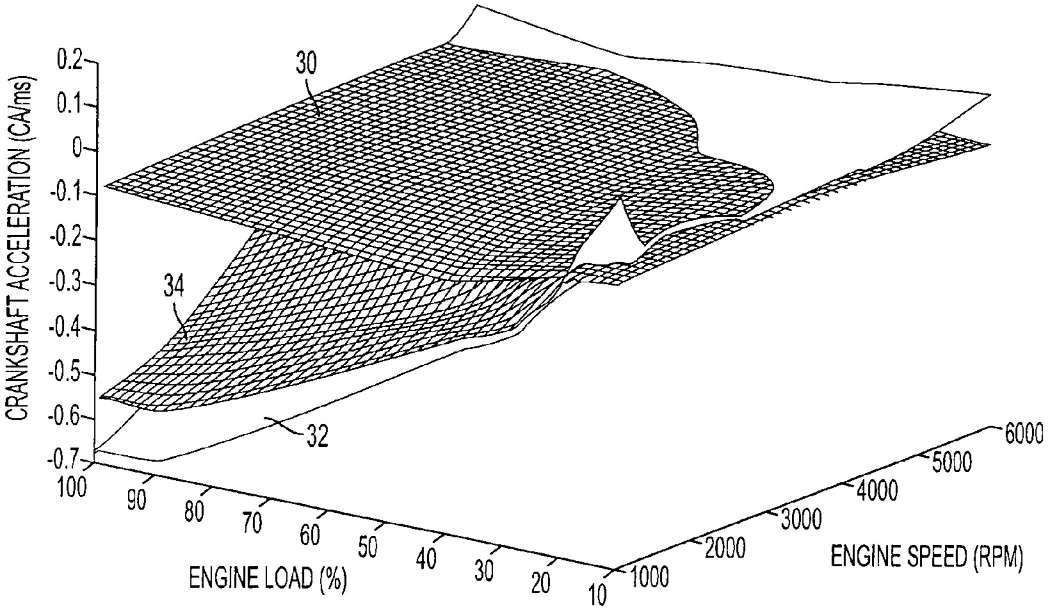
FIG. 5 is a graph of three three dimensional surfaces according to an embodiment of the present invention.
FIG. 6 is an ECU map according to an embodiment of the present invention.

In step S708, a three dimensional threshold surface is generated based on the three dimensional surfaces corresponding to each set of crankshaft acceleration data as shown in FIG. 5. FIG. 5 is a graph of three three dimensional surfaces according to an embodiment of the present invention. In FIG. 5, the three dimensional threshold surface 34 is generated based on the three dimensional surface 30 for the crankshaft acceleration data for the engine operating under normal conditions and the three dimensional surface 32 for the crankshaft acceleration data for the engine operating under the malfunctioning condition. Three dimensional surface 30 could be, for example, an average of a plurality of three dimensional surfaces generated in step S706 that correspond to the one or more sets of crankshaft acceleration data for the engine operating under normal condition. Three dimensional surface 32 could also be, for example, an average of a plurality of three dimensional surfaces generated in step S706 that correspond to the one or more sets of crankshaft acceleration data for the engine operating under normal condition.

The three dimensional threshold surface 34 can be generated by offsetting the three dimensional surface 30 and/or three dimensional surface 32. For example, the three dimensional threshold surface 34 can be generated by adding one or more sigma offsets to three dimensional surface 32 and/or subtracting one or more sigma offset to three dimensional surface 30. The graph, as exemplified in FIG. 5, can be shown in display 4 of FIG. 1. A user can also adjust any variables accordingly to produce the desired three dimensional threshold surface 34. Any adjustments to the three dimensional threshold surface 34 can be displayed in display 4 for visual inspection by the user.

In step S710, an ECU map can be generated as shown in FIG. 6. FIG. 6 is an ECU map according to an embodiment of the present invention. In FIG. 6, the ECU map is generated using the crankshaft acceleration data points of the three dimensional threshold surface 34 with crankshaft acceleration data points correlating with engine load values 36 and engine speed values 38. It is contemplated that each of the crankshaft acceleration data points has a corresponding engine load value and an engine speed value. The ECU map as, exemplified in FIG. 6, can be shown on display 4 of FIG. 1.

In step S712, the ECU map is loaded onto ECU 10. ECU 10 can then use the ECU map when monitoring the operation of engine 8. For example, when ECU 10 detects that engine 8 is operating at 600 RPM with a 36% engine load, the threshold for the change in crankshaft acceleration is −0.3106. If the change in crankshaft acceleration is above −0.3106, then ECU 10 can detect that engine 8 is operating under normal conditions. However, if the change in crankshaft acceleration is below −0.3106, then ECU 10 can detect that engine 8 is operating under the malfunctioning condition.

In one embodiment, an ECU map is generated for each malfunctioning condition such as a first ECU map for a first piston misfiring and a second ECU map for a second piston misfiring. In another embodiment, an ECU map is generated for all of the malfunctioning condition such as one ECU map for the first piston misfiring and the second piston misfiring.

With the present invention, a more accurate ECU map can be created utilizing less crankshaft acceleration data points to create the ECU map. Since less crankshaft acceleration data points are required to produce the ECU map, less time is required to produce the ECU map. Furthermore, since the present invention can utilize crankshaft acceleration data from any engine speed and/or engine load, the present invention can reduce the necessity to adjust the engine operation to achieve a specific engine speed and/or engine load. This can further reduce the time necessary to create an ECU map since adjusting the engine operation to achieve a specific engine speed and/or engine load can require additional amounts of time which add up to hundreds if not thousands of crankshaft acceleration data points. For example, using conventional equipment and conventional methods, approximately 5,300 man hours were required to test all 8 cylinders of an 8 cylinder engine. However, with the present invention, it is contemplated that all 8 cylinders of an 8 cylinder engine can be tested in approximately 700 man hours. Thus, the present invention may be more than seven times as efficient as conventional equipment and methods.

The previous description of the disclosed examples is provided to enable any person of ordinary skill in the art to make or use the disclosed methods and apparatus. Various modifications to these examples will be readily apparent to those skilled in the art, and the principles defined herein may be applied to other examples without departing from the spirit or scope of the disclosed method and apparatus. The described embodiments are to be considered in all respects only as illustrative and not restrictive and the scope of the invention is, therefore, indicated by the appended claims rather than by the foregoing description. All changes which come within the meaning and range of equivalency of the claims are to be embraced within their scope.

What is claimed is:

1. A method for calibrating an automobile diagnostic system with a calibration unit, the method comprising:

receiving, at the calibration unit, first automobile data based on an automobile operating under a first condition, the first automobile data including a first data point and a second data point;

generating, using the calibration unit, interpolated first automobile data by performing three dimensional interpolation on the first automobile data using the first data point and the second data point;

receiving, at the calibration unit, second automobile data based on an automobile operating under a second condition, the second automobile data including a third data point and a fourth data point;

generating, using the calibration unit, interpolated second automobile data by performing three dimensional interpolation on the second automobile data using the third data point and the fourth data point; and generating, using the calibration unit, threshold automobile data using the interpolated first automobile data or the interpolated second automobile data.

2. The method of claim 1 wherein the automobile operating under the first condition is an automobile operating under a non-malfunctioning condition and the automobile operating under the second condition is an automobile operating under a malfunctioning condition.

3. The method of claim 1 wherein the first automobile data and the second automobile data correspond to crankshaft acceleration data.

4. The method of claim 1 wherein the step of generating threshold automobile data includes adding or subtracting an offset to the interpolated first automobile data or the interpolated second automobile data.

5. The method of claim 4 further comprising the step of generating an engine control unit ("ECU") map using the threshold automobile data.

6. The method of claim 4 wherein the offset is user variable for generating desired threshold automobile data.

7. The method of claim 1 further comprising the step of displaying the threshold automobile data as a three dimensional threshold surface on a display for visual inspection.

8. The method of claim 1 wherein:

the step of receiving the first automobile data includes collecting the first automobile data using a first parameter and a second parameter, the value of the first parameter being varied while the value of the second parameter being held substantially constant; and the step of receiving the second automobile data includes collecting the second automobile data using the first parameter and the second parameter, the value of the first parameter being varied while the value of the second parameter being held substantially constant.

9. The method of claim 8 wherein:

collecting the first automobile data includes using a plurality of values of the second parameter; and collecting the second automobile data includes using a plurality of values of the second parameter.

10. The method of claim 9 wherein the first parameter corresponds to engine load and the second parameter corresponds to engine speed.

11. A system for calibrating an automobile having an engine and an engine control unit ("ECU"), the system comprising:

a calibration unit configured to be connected to the engine or the ECU of the automobile, the calibration unit configured to receive first engine data based on the engine operating under a first condition, the first engine data having a first data point and a second data point, interpolate the first engine data three dimensionally using the first data point and the second data point, receive second engine data based on the engine operating under a second condition, the second engine data having a third data point and a fourth data point, interpolate the second engine data three dimensionally using the third data point and the fourth data point, and generate threshold engine data using the interpolation of the first engine data or the interpolation of the second engine data.

12. The system of claim 11 wherein:

the first engine data and the second engine data correspond to crankshaft acceleration data, and each of the first engine data and each of the second engine data correlate with an engine speed value and an engine load value.

13. The system of claim 11 wherein the engine operating under the first condition is an engine operating under a non-malfunctioning condition and the engine operating under the second condition is an engine operating under a malfunctioning condition.

14. The system of claim 11 wherein the generation of the threshold engine data includes the application of at least one offset to the interpolation of the first engine data or to the interpolation of the second engine data.

15. The system of claim 14 wherein the at least one offset is adjustable by a user of the calibration unit.

16. The system of claim 11 further comprising a display configured to display the interpolation of the first engine data, the interpolation of the second engine data or the threshold engine data for visual inspection.

17. The system of claim 11 wherein the ECU is configured to receive the threshold engine data from the calibration unit for monitoring the operation of the engine.

18. A method for calibrating an automobile engine monitoring system with a calibration unit, the method comprising:

collecting crankshaft acceleration data for an engine operating under a non-malfunctioning condition, each of the crankshaft acceleration data for the engine operating under the non-malfunctioning condition correlated with an engine speed value and an engine load value;

interpolating the crankshaft acceleration data for the engine operating under the non-malfunctioning condition in three dimensions;

collecting crankshaft acceleration data for an engine operating under a malfunctioning condition, each of the crankshaft acceleration data for the engine operating under the malfunctioning condition correlated with an engine speed value and an engine load value;

interpolating the crankshaft acceleration data for the engine operating under the malfunctioning condition in three dimensions; and generating threshold automobile data by offsetting from the three dimensional interpolation of the crankshaft acceleration data for the engine operating under the non-malfunctioning condition or the three dimensional interpolation of the crankshaft acceleration data for the engine operating under the malfunctioning condition.

* * * * *